United States Patent [19]

Knoll et al.

[11] 4,421,148
[45] Dec. 20, 1983

[54] DEVICE FOR FEEDING PARTICULATE MATERIAL

[75] Inventors: Frank S. Knoll, Jacksonville; Arnold H. Jackson, Orange Park, both of Fla.

[73] Assignee: Carpco, Inc., Jacksonville, Fla.

[21] Appl. No.: 316,138

[22] Filed: Oct. 29, 1981

[51] Int. Cl.³ .............................................. B65B 1/30
[52] U.S. Cl. .................................... 141/392; 198/526; 198/537; 222/528; 222/534
[58] Field of Search ........ 141/283, 284, 392, 250–282; 222/526, 537; 198/528, 534; 118/308

[56] References Cited

U.S. PATENT DOCUMENTS

| | | | |
|---|---|---|---|
| Re. 26,291 | 10/1967 | Carrier | 198/534 |
| 256,404 | 4/1882 | Straughn | 222/526 |
| 663,764 | 12/1900 | Krueser et al. | |
| 675,162 | 5/1901 | Noble | |
| 739,223 | 9/1903 | Schutz et al. | |
| 758,300 | 4/1904 | Davidson | |
| 910,664 | 1/1909 | Green | |
| 1,866,781 | 7/1932 | Ullrich | |
| 2,354,419 | 7/1944 | Lingerfelt et al. | |
| 3,103,915 | 9/1963 | Crain et al. | 198/534 |
| 3,986,622 | 10/1976 | Vaughan et al. | 198/534 |
| 4,193,489 | 3/1980 | Siniscal | 198/534 |

FOREIGN PATENT DOCUMENTS

| | | | |
|---|---|---|---|
| 192464 | 8/1906 | Fed. Rep. of Germany | 198/534 |
| 606698 | 3/1926 | France | 198/528 |
| 55-22178 | 2/1980 | Japan | 222/526 |
| 821354 | 10/1959 | United Kingdom | 198/534 |

*Primary Examiner*—Houston S. Bell, Jr.
*Attorney, Agent, or Firm*—Arthur G. Yeager

[57] ABSTRACT

A device for feeding particulate material to a moving surface comprising a hopper for containing particulate material and having an outlet in the bottom for dispensing that material; a moving surface spaced downwardly from the outlet of the hopper and adapted to receive particulate material distributed across the surface; a receiver spaced downwardly from the outlet of the hopper to receive particulate material from the outlet and to direct that material generally horizontally to fall from an open edge of the receiver; and a vertical chute to receive the particulate material falling from the open edge of the receiver and to direct it downwardly and then horizontally to a dispensing edge spaced vertically above and closely adjacent to the moving surface.

25 Claims, 4 Drawing Figures

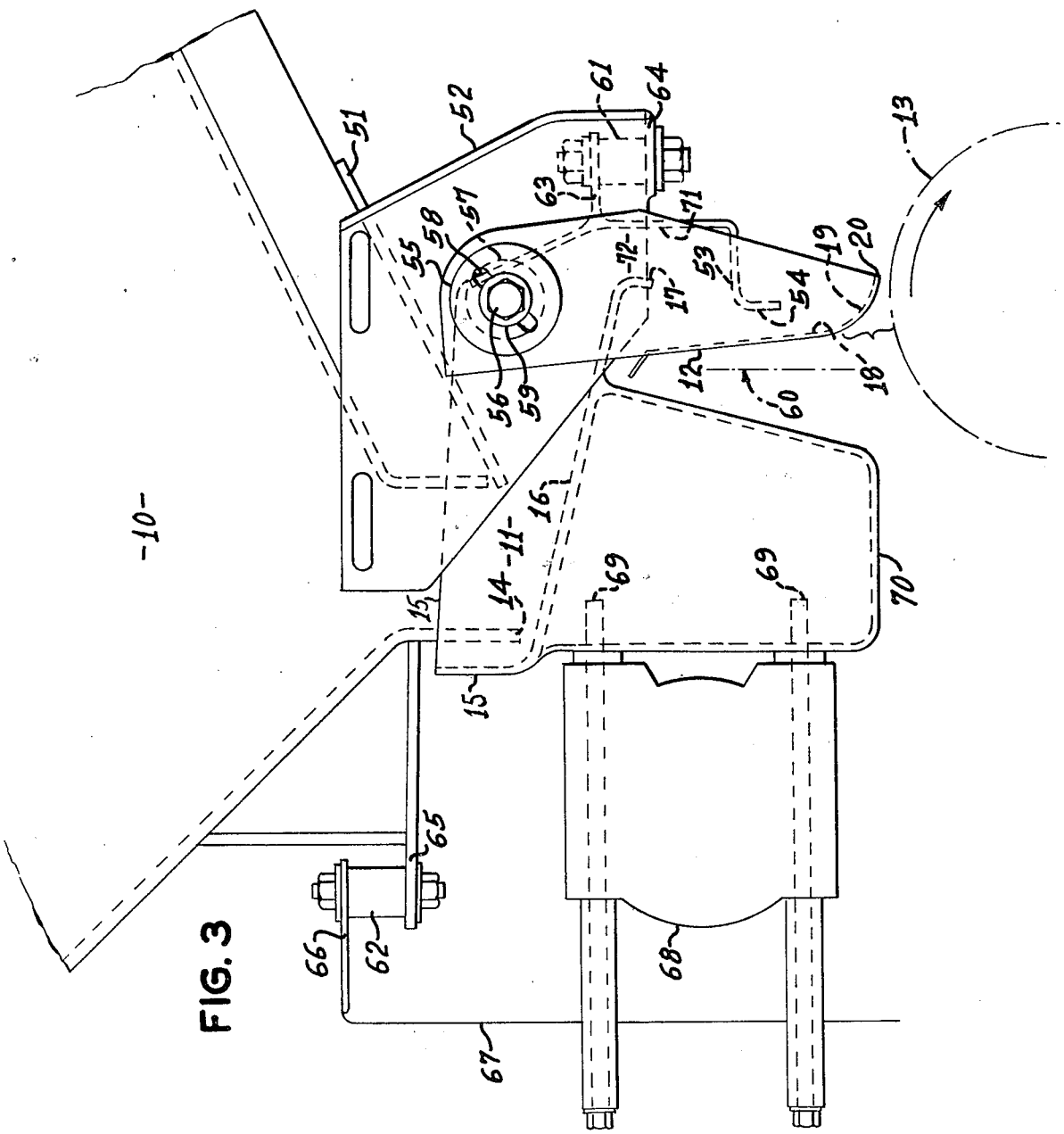

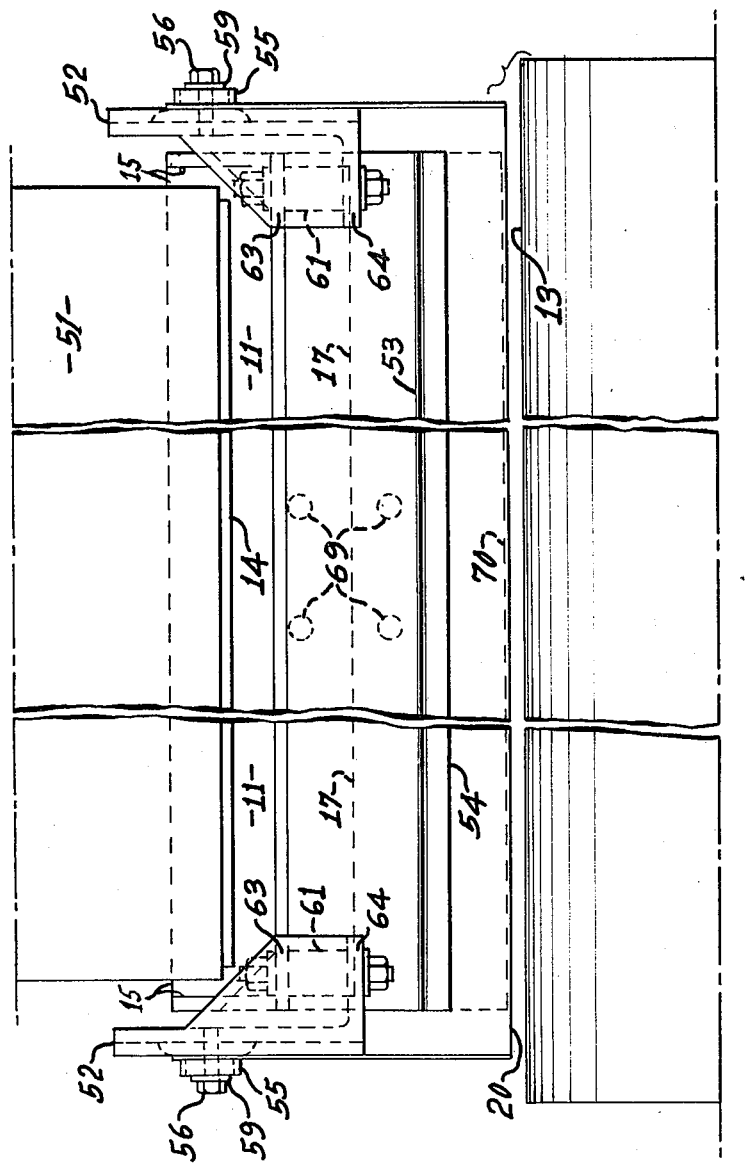

DEVICE FOR FEEDING PARTICULATE MATERIAL

BACKGROUND OF THE INVENTION

Granular materials including ores, plastics and metallic materials are commonly treated by a variety of separation devices to concentrate or upgrade one or more of the constituents. Magnetic separators and electrostatic separators are well known and available to perform some of these tasks. Usually such separators function with a moving surface to receive and transport the mixture of particles under a magnetic or electrostatic field to perform the separation. The introduction of materials to various separation devices plays an extremely important role in the quality and efficiency of the separation which is to take place. Proper introduction of materials and/or feeding to any separation device will also reduce wear of separator components due to particle bounce and scattering thereof. It is therefore necessary, if the separation is to be as efficient as possible, that the mixture of particles be (1) distributed uniformly and thinly across the moving surface, and (2) be introduced at approximately the same speed or trajectory across the surface. The moving surface may be an endless belt, a revolving cylinder, a rotating conical surface or the like.

It is an object of this invention to provide a device for feeding particulate material in an even distribution across the width of a moving surface, especially for purposes of separating the particles into individual types. It is another object of this invention to provide a feeding mechanism for subsequent electrostatic or magnetic separation of different types of particles. Still other objects will be apparent from the more detailed description of this invention which follows.

BRIEF SUMMARY OF THE INVENTION

This invention comprises a device for feeding particulate material to a moving surface comprising (a) a hopper for containing a volume of particulate material or for receiving particulate material in a steady flow state and having an outlet in the bottom for dispensing the particulate material;

(b) a cup-shaped pan encircling and spaced downwardly from said outlet and having a spillway on one side thereof;

(c) a generally vertical chute in communication with said pan and adapted to receive material from the spillway, permit the material to fall vertically to gain linear speed, and discharge such material in a generally horizontal direction in the same direction as said moving surface from the bottom of said chute; and (d) means for adjustably attaching said chute with respect to said spillway and with respect to said moving surface passing underneath and adjacent to the bottom of said chute to vary the velocity of said particulate material being discharged and the location of the bottom of said chute with respect to said moving surface.

In a preferred embodiment of this invention the cup-shaped pan and the vertical chute are adjustable with respect to the hopper and to the moving surface so as to provide selected feed rates and selected dispensing speeds onto the moving surface. In another specific embodiment of this invention the cup-shaped pan is vibrated.

BRIEF DESCRIPTION OF THE DRAWINGS

The novel features believed to be characteristic of this invention are set forth with particularity in the appended claims. The invention itself, however, both as to its organization and method of operation together with further objects and advantages thereof, may best be understood by reference to the following description taken in connection with the accompanying drawings in which:

FIG. 3 is a side elevational view of another embodiment of the feeding device of this invention; and FIG. 4 is a front elevational view of the feeding device of FIG. 3.

DETAILED DESCRIPTION OF THE INVENTION

Figure 1:
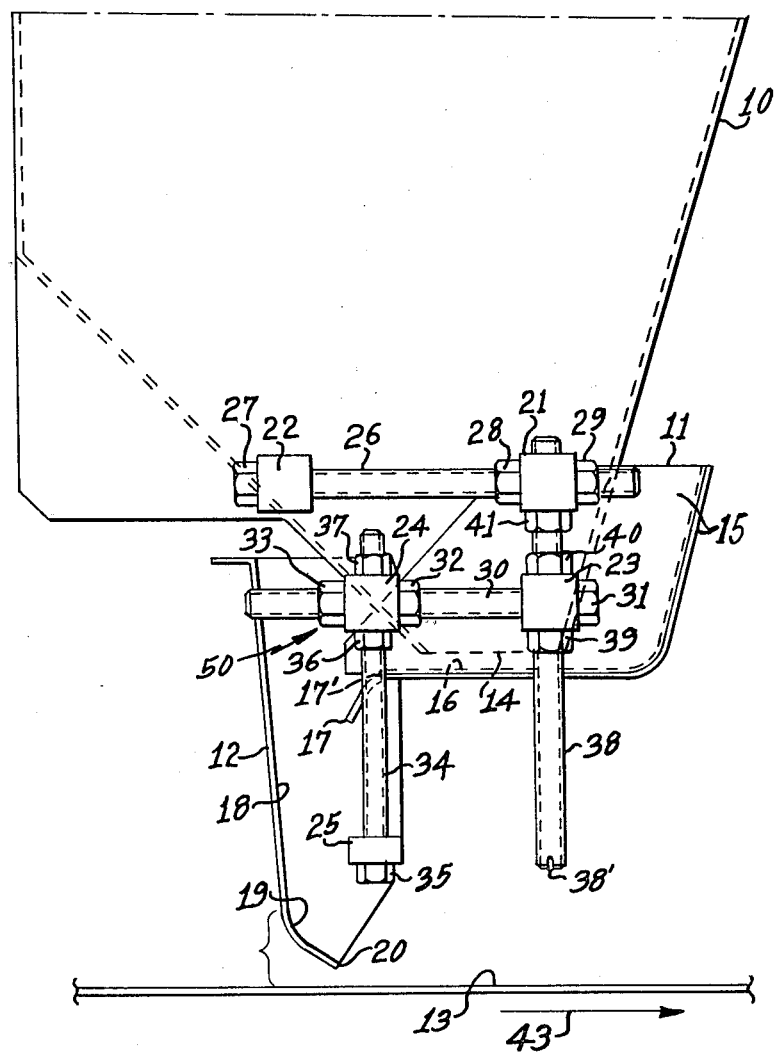
FIG. 1 is a front elevational view of one embodiment of the feeding device of this invention.
Figure 2:
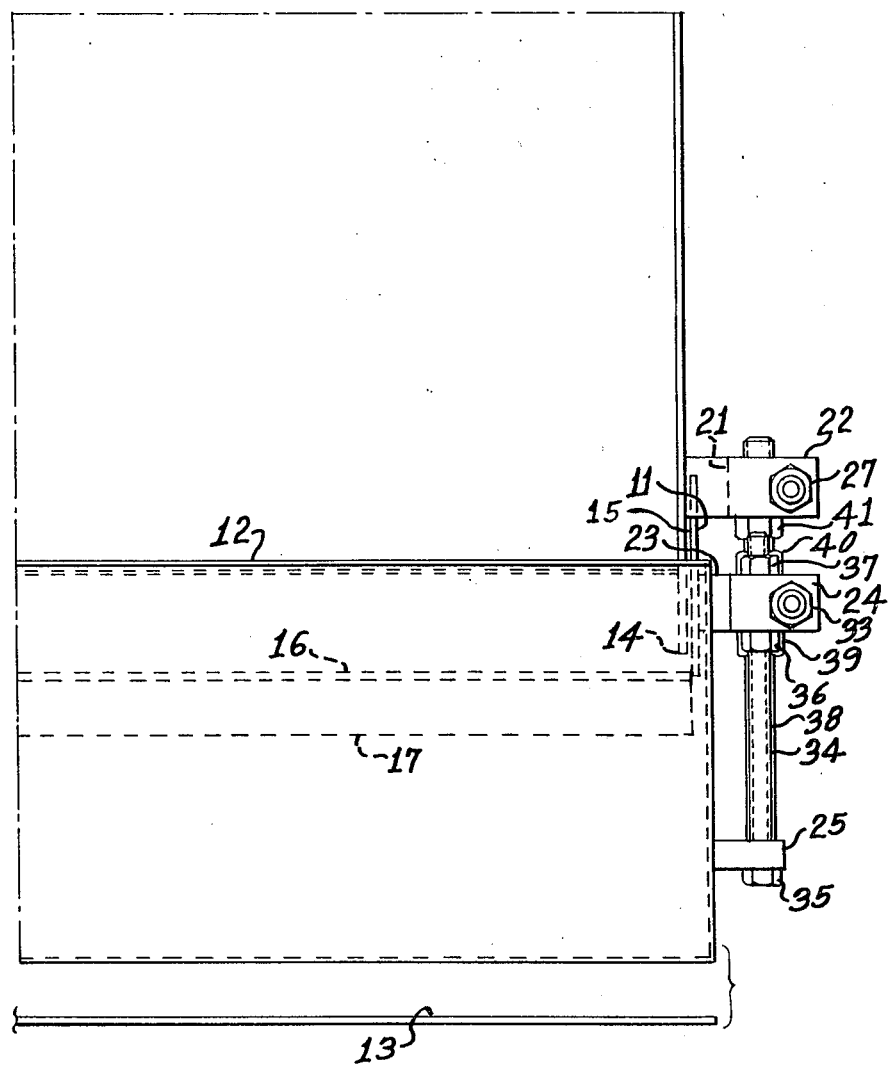
FIG. 2 is a side elevational view of the feeding device shown in FIG. 1.

One of the embodiments of this invention may be seen in FIGS. 1 and 2. Hopper 10 is designed to receive and hold a large volume of mixed particulate materials which are to be spread evenly in a thin layer across the entire width of moving surface 13, which may be an endless belt moving in the direction of arrow 43. Hopper 10 has steep, sloping walls leading to an opening 14 in the bottom thereof to function as an outlet for the materials contained in hopper 10. Generally these materials will fall by gravity toward outlet 14 without any necessity of employing a positive force for moving those particles toward outlet 14. If such a device is believed necessary it may be installed in the interior of hopper 10, e.g. a screw feed device.

Encircling opening 14 is a cup-shaped pan functioning as a receiver for the material discharged through outlet 14. If outlet 14 is generally rectangular in shape, receiver 11 may also be generally rectangular in shape. If outlet 14 is circular in shape, receiver 11 would preferably also be generally circular in shape. Sidewalls 15 of receiver 11 are sufficiently high to prevent overflow of materials discharged from outlet 14 into the interior of receiver 11 over the full vertical adjustment range of receiver 11. Bottom wall 16 of receiver 11 is positioned vertically above moving surface 13 according to the drop height required to accelerate the material to a speed approaching that of moving surface 13. One side of receiver 11 (in FIG. 1 the left side) is open and does not have a sidewall such as sidewall 15. Bottom wall 16 terminates in an open edge or flange 17 over which particulate material from hopper 10 is permitted to fall into vertical chute 12. In this embodiment of the invention flange 17 is a smoothly rounded vertical spillway from which the particulate material is fed into vertical chute 12.

Vertical chute 12 extends substantially across the entire length of flange 17 enclosing it on at least three sides and having an open dispensing edge 20 spaced vertically downward from flange 17. Sidewall 18 of chute 12 receives the particles flowing over spillway or flange 17 and directs them downwardly permitting them to fall a vertical distance to increase their linear speed by acceleration due to gravity and turns them by means of large radius forming a generally horizontal flange 19 and discharges them from dispensing edge 20 onto moving surface 13 at approximately the same speed as that of moving surface 13. The direction of particles being dispensed from edge 20 must, of course, be in the same direction as that of moving surface 13 indicated by arrow 43. In order for the falling particles in chute 12 to be discharged smoothly onto moving surface 13, which is substantially horizontal, the bottom portion of chute 12 changes direction at 19 by means of a large radius in order that dispensing edge 20 directs the particles in a generally horizontal direction closely adjacent belt 13 whereby 20 directs the particles in a generally horizontal direction closely adjacent belt 13 whereby particle bounce and/or scattering of the particles are inhibited.

There must not be any buildup of any particles in chute 12 at dispensing edge 20 since such an occurrence would destroy the attempt to make the speed of the particles leaving dispensing edge 20 closely match the speed of moving surface 13. Therefore, in accordance with this invention, controls and adjustments are provided which can be manipulated so that the particles discharged from hopper 10 are fed uniformly and at the proper speed to be dispensed as a thin, evenly distributed layer onto moving surface 13. The adjustment means for the controlled velocity feeding device depicted in FIGS. 1 and 2, is a combination of adjusting screws or bolts 26, 30, 34 and 38, designed to move receiver pan 11 vertically and horizontally with respect to moving surface 13 and to move chute 12 vertically with respect to moving surface 13 and horizontally with respect to open edge 17. The adjustment means, generally designated 50, comprises bosses 21, 22, 23, 24 and 25, bosses 22, 23 and 25 being threaded, and all bosses support threaded screws or bolts 26, 30, 34, and 38. When bolt head 27 engages boss 22, the threaded connection therebetween makes bolt 26 a threaded support upon which floating boss 21 upon loosening and tightening nuts 28 and 29, may move, for example, to the left to bring receiver 11 toward hopper 10. Similarly bolt head 31 engages boss 23 and bolt head 35 engages boss 25. Screw 38 has a threaded engagement with floating boss 21 and is locked in position with nut 41 while being held at slot 38'. To move receiver 11 upwardly or downwardly to adjust the distance between edge 17 and moving surface 13, nuts 37 and 40 are loosened and turned in the appropriate direction and retightened. Of course, when boss 23 is adjusted downwardly, boss 24 moves down and may require vertical adjustment of chute 21 by loosening and tightening of nuts 36 and 37. Chute 12 may be repositioned closer or further away from edge 17 by loosening and tightening nuts 32 and 33. Suitable pairs of nuts 28 and 29; 32 and 33; 36 and 37; and 39 and 40 (and 41); are shown for maintaining the selected adjusted positions of the bosses 21, 23 and 24 on the bolts and screws. Boss 22 is fixed to hopper 10, boss 23 is fixed to receiver pan 11, boss 25 is fixed to chute 12, and bosses 21 and 24 are unfixed and move when appropriate adjustments are made. It may be seen by appropriate movements of the floating bosses 21 and 24 on the four bolts or screws, receiver pan 11 can be moved vertically closer to or farther away from moving surface 13 to provide less or more material particle height from open edge 17. Similarly, chute 12 may be moved horizontally with respect to spillway edge 17 to enhance smooth flow discharge of material over edge 20. Chute 12 is also adjustable vertically to match drop height between edge 17 and moving surface 13. While spillway edge 17 is shown as being at an acute angle from the vertical, the flange may be vertical so that the particles are discharged from the spillway 17', i.e., the upper edge of the flange, which in the apparatus shown in FIG. 1 would require the movement of chute 12 closer to spillway 17' to insure proper receipt of particles by and discharge thereof from chute 12 onto moving surface 13.

In order to maintain the proper flow and distribution of particles through receiver 11 it often may require a means for vibrating receiver 11. Rotating eccentric devices are well known to provive vibrational motion and can readily be attached to receiver 11 in any manner known in the industry today.

The embodiment of the velocity feeding device of this invention particularly suited for forced feeding of particulate materials from a hopper is shown in FIGS. 3 and 4. Hopper 10 has a bottom opening 14, preferably adjustable by means of moving gate 51. Particulate materials from hopper 10 drop into receiver pan 11 having a sloping bottom wall 16 which terminates in an open edge by flange 17. A forward wall 71 of pan 11 provides in combination with flange 17 a restricted throat 72 through which the particulate material falls onto ledge 53 and is directed into chute 12 by falling over spillway flange 54. The particulate material is then directed by wall 18 and curve 19 to dispensing edge 20 where the particulate material is dropped onto moving surface 13, which in this instance is a cylindrical or conical surface rotating about its axis in the direction 43.

In this embodiment pan 11, wall 16, wall 71, flange 72, ledge 53, and flange 54 are all part of a single rigid structure including a supporting rigid body 70.

Chute 12 is adjustably attached to rigid chute support 52 by means of bolts 56, washer 59, slotted washer 55, and a suitable threaded hole in support 52 to receive bolt 56. Slot 58 in washer 55 and hole 57 in chute 12 permit adjustment of chute 12 with respect to spillway flange 54 and with respect to moving surface 13. In this embodiment chute 12 may be adjusted horizontally, vertically, and angularly within the limits of slot 58 and hole 57. Preferably, wall 18 will be adjusted angularly to be about 5°–10°, most preferably about 6°, from the vertical to provide the most efficient dispensing action from edge 20. Adjustments with respect to flange 54 and to moving surface 13 are for the same purposes as mentioned above in the description of FIGS. 1 and 2, i.e. to provide the particulate material with appropriate linear speed flow rate, and direction to spread over surface 13 with a minimum of particulate bounce and the optimum in even distribution.

A vibrating mechanism 68 is shown to provide vibration to receiver pan 11 without permitting that vibration to adversely affect the remainder of the device. Vibrator 68 is attached by four screws 69 to the wall of pan support 70 and is supported on plate 67. The vibration produced, e.g. by eccentric means, are transmitted through screws 69 to pan 11 and provide the positive forced feeding of particulate material across bottom wall 16 toward flange 17 in throat 72. In order to isolate the remainder of the feeding device from the vibrations, there are provided vibration dampeners 61 and 62. Dampener 61 provides a supporting connection between pan 11 and chute support 52. Flange 63 is rigidly connected to pan 11 and flange 64 is rigidly connected to chute support 52. Similarly, dampener 62 provides a supporting connection between hopper 10 and vibrator support plate 67. Flange 66 is rigidly connected to plate 67 and flange 65 is rigidly connected to hopper 10. Vibration dampeners 61 and 62 are well known prior art devices in which the body of the dampener is rubber or 10. In the device of claim 6 wherein said moving surface is the horizontal upper surface of a continuously moving belt.

11. In the device of claim 1 wherein said chute means includes a generally horizontal flange having a dispensing edge spaced above said moving surface for discharging said material in the same general direction and onto said moving surface.

12. In the device of claim 8 wherein said adjustment is attained by screw thread means attached to said receiver and said chute.

13. In the device of claim 8 wherein the adjustment is attained by a slot in said chute and a clamping means cooperating with said slot.

14. In the device of claim 6 wherein said chute is pivotable to provide rotational adjustment of the chute from the vertical position to a nonvertical position.

15. In the device of claim 6 which additionally comprises a chute support attached to said connection receiver through a vibration dampening means, said chute being adjustably attached to said chute support.

16. In the device of claim 15 wherein the attachment of said chute to said chute support includes a slot and a means to clamp said chute to said chute support at selected locations along said slot.

17. In the system for feeding particulate material from a supply container to a moving surface passing generally horizontally beneath the supply container in a predetermined direction comprising discharging particulate material continuously from the bottom of said container onto a transverse surface, dropping said particulate material from one edge of said transfer surface into a vertical passageway having a bottom discharge outlet adjacent to and directed generally tangential to and in the same direction as said moving surface, the vertical dropping distance from said transverse surface to said discharge outlet being sufficient to increase the linear speed of said particulate materials to approximately the same as the linear speed of said moving surface.

18. In the system of claim 17 wherein said transverse surface slopes downwardly from a position adjacent the bottom of said container to said edge.

19. In the system of claim 17 further comprising vibration means for vibrating said transverse surface to forcibly feed said particulate material from said supply container.

20. In the system of claim 17 wherein said moving surface is substantially flat.

21. In the system of claim 17 wherein said moving surface is convexly curved.

22. In the system of claim 17 wherein said vertical dropping distance is adjustable to vary the linear speed of said particulate materials.

23. In the system of claim 17 wherein the direction of said bottom discharge outlet with respect to said moving surface is adjustable.

24. In the system of claim 17 wherein said vertical passageway includes means for adjusting the distance between said discharge outlet and said moving surface and means for adjusting the angularity between said vertical passageway with respect to the vertical.

25. In the system of claim 24 wherein said vertical dropping distance is adjustable to vary the linear speed of said particulate materials.

* * * * * a spring device fixed at each end to a connecting flange in such a fashion that one end of the dampener can vibrate while the other end is rigid.

The velocity feeding devices of this invention are made adjustable to provide optimum handling and dispensing characteristics for such variables as:
(1) particle size,
(2) particle density,
(3) particle flow rate out of hopper,
(4) amount of particles being fed,
(5) velocity trajectory, and direction of particles being fed onto moving surface,
(6) curvature and speed of moving surface,
(7) angle of feed chute, and
(8) position of chute with respect to moving surface.

These characteristics make the devices of this invention desirable as feeders for magnetic or electrostatic separators of the roll-type or the belt-type. There are many applications where it is important to employ multi-stage separation in order to accomplish the desired results. It has frequently been found desirable in such multi-state operations to employ a vibratory device (as in FIGS. 3 and 4) to feed the first stage separator and to employ the nonvibratory device (as in FIGS. 1 and 2) for feeding succeeding stages of separators.

Conventional feeding devices of the prior art generally provide a hopper with an adjustable gate closure on the bottom opening and an inclined trough from the bottom opening of the hopper to the moving surface of the separator. The advantages of the devices of this invention over such a conventional feeder are:
(1) independent control of feed rate and feed velocity,
(2) less particle bounce and particle scatter,
(3) reduced wear due to particle bounce and scatter,
(4) increased throughput rates,
(5) higher separation efficiency,
(6) improved product purity in magnetic or electrostatic separation,
(7) capability of feeding a wide range of particle sizes from fine to coarse,
(8) more compact design,
(9) can be designed to feed moving surfaces with a wide range of widths, e.g. 6" to 120", and
(10) lower power costs when using vibrators as compared to electro-magnetic drives, e.g. 24 vs. 240 watts per drive unit.

In a series of tests on a variety of types of particulate materials, a conventional feeder, described above, was compared to the embodiment of FIGS. 3 and 4 in feeding a magnetic separator. The following results were obtained:

|  | Conventional Feeder | FIGS. 3 and 4 Feeder | % Improvement |
|---|---|---|---|
| Product Purity % Contamination | 3.3 | 1.4 | 58 |
| Product Recovery % Distribution | 81.1 | 99.4 | 23 |

While the invention has been described with respect to certain specific embodiments, it will be appreciated that many modifications and changes may be made by those skilled in the art without departing from the spirit of the invention. It is intended, by the appended claims to cover all such modifications and changes as fall within the true spirit and scope of the invention.

What is claimed as new and what it is desired to secure by Letters Patent of the United States is:

1. In a device for feeding a thin evenly distributed layer of particulate material to a moving surface comprising
    (a) a hopper for containing particulate material and having an outlet in the bottom for discharging the particulate material;
    (b) a cup-shaped pan encircling and spaced downwardly from said outlet, and having a spillway on one side thereof;
    (c) a generally vertical chute means in communication with said pan and adapted to receive material from the spillway, permit the material to fall vertically to gain linear speed, and discharge such material in a generally horizontal direction in the same direction as said moving surface from the bottom of said chute means; and
    (d) connection means for adjustably attaching said chute means with respect to said spillway and with respect to said moving surface passing underneath and adjacent to the bottom of said chute means to vary the velocity of said particulate material being discharged and the location of the bottom of said chute means with respect to said moving surface.

2. In the device of claim 1 further comprising vibration means for vibrating said pan to forcibly feed said particulate material from said hopper into said chute means.

3. In the device of claim 2 wherein the vibrations of said pan are isolated from said hopper, said chute means and said connecting means for adjustably attaching said chute means.

4. In the device of claim 1 wherein said connection means for adjustably attaching includes means for varying the volume of said particulate material discharging from said hopper to said pan per unit of time.

5. In the device of claim 1 wherein said means is adjustable both horizontally and vertically with respect to said pan.

6. In a device for feeding particulate material onto a moving surface in an evenly distributed thin layer comprising
    (a) an endless moving surface upon which particulate material is fed in an evenly distributed thin layer;
    (b) a hopper for containing particulate material positioned above said moving surface and having a discharging outlet in the bottom thereof;
    (c) a receiver spaced vertically downward from said outlet for receiving particulate material therefrom and adapted to direct such material generally horizontally to freely fall from an edge of the receiver; and
    (d) a vertical chute to receive the material falling from said edge and to direct it downwardly to a horizontal dispensing edge spaced vertically above and closely adjacent to said moving surface, said dispensing edge extending substantially across the entire width of the moving surface and disposed to dispense said material in the same direction as that of the moving surface.

7. In the device of claim 6 further comprising vibration means for vibrating said receiver.

8. In the device of claim 6 wherein the vertical distance from said open edge and said dispensing edge is adjustable.

9. In the device of claim 6 wherein the opening of said discharging outlet is adjustable.